United States Patent
Rahajandraibe et al.

(10) Patent No.: US 9,921,317 B2
(45) Date of Patent: Mar. 20, 2018

(54) DEVICE AND METHOD FOR DETECTING RADIATION PARTICLES

(71) Applicants: UNIVERSITE D'AIX MARSEILLE, Marseilles (FR); CENTRE NATIONAL DE LA RECHERCHE SCIENTIFIQUE, Paris (FR); UNIVERSITE D'AVIGNON, Avignon (FR)

(72) Inventors: Wenceslas Rahajandraibe, Marseilles (FR); Hassen Aziza, Allauch (FR); Karine Castellani-Coulie, Salon de Provence (FR); Gilles Micolau, Marseilles (FR)

(73) Assignees: UNIVERSITÉ D'AIX MARSEILLE, Marseilles (FR); CENTRE NAITONAL DE LA RECHERCHE SCIENTIFIQUE, Paris (FR); UNIVERSITÉ D'AVIGNON, Avignon (FR)

( * ) Notice: Subject to any disclaimer, the term of this patent is extended or adjusted under 35 U.S.C. 154(b) by 0 days.

(21) Appl. No.: 15/124,623

(22) PCT Filed: Mar. 11, 2015

(86) PCT No.: PCT/FR2015/050604
§ 371 (c)(1),
(2) Date: Sep. 8, 2016

(87) PCT Pub. No.: WO2015/136220
PCT Pub. Date: Sep. 17, 2015

(65) Prior Publication Data
US 2017/0017001 A1   Jan. 19, 2017

(30) Foreign Application Priority Data
Mar. 11, 2014 (FR) ..................................... 14 52017

(51) Int. Cl.
*G01T 1/24* (2006.01)
*G01T 1/17* (2006.01)

(52) U.S. Cl.
CPC ................ *G01T 1/247* (2013.01); *G01T 1/17* (2013.01)

(58) Field of Classification Search
CPC .................................. G01T 1/247; G01T 1/17
(Continued)

(56) References Cited

U.S. PATENT DOCUMENTS

2002/0196170 A1   12/2002   McIlrath
2006/0186342 A1*   8/2006   Burger ...................... G01T 1/17
                                                           250/370.01
(Continued)

FOREIGN PATENT DOCUMENTS

WO   02/079803 A1   10/2002
WO   2006/078720 A2   7/2006
WO   2007/146587 A2   12/2007

OTHER PUBLICATIONS

S. Bastianini, et al., "A 0.18 μm CMOS low-power radiation sensor for asynchronous event-driven UWB wireless transmission," Nuclear Instruments and Methods in Physics Research A, vol. 730, 2013, pp. 105-110, XP028770261.
(Continued)

*Primary Examiner* — David Porta
*Assistant Examiner* — Meenakshi Sahu
(74) *Attorney, Agent, or Firm* — Oblon, McClelland, Maier & Neustadt, L.L.P.

(57) ABSTRACT

A device for detecting radiation particles comprising at least one sensor for sensing radiation particles, capable of supplying an electrical pulse when it is traversed by at least one radiation particle, and at least one detection circuit comprising a voltage-controlled oscillator to which said electrical pulse originating from the sensor is supplied as the control voltage. The voltage-controlled oscillator is a ring oscillator.

12 Claims, 4 Drawing Sheets

Figure 1:
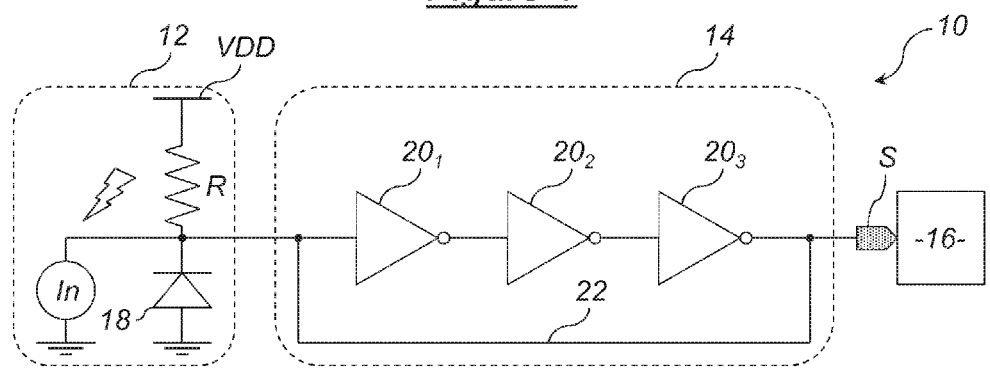

(58) Field of Classification Search
USPC .................................................. 250/370.14
See application file for complete search history.

(56) References Cited

U.S. PATENT DOCUMENTS

2007/0075251 A1* 4/2007 Doughty ................ G01T 1/026
250/370.01
2009/0250616 A1 10/2009 Solf et al.

OTHER PUBLICATIONS

S. Holland, "Properties of CMOS Devices and Circuits Fabricated on High-Resistivity, Detector-Grade Silicon," Proceedings of the Nuclear Science Symposium and Medical Imaging Conference, 1991, pp. 597-601, XP10057981.

K. Castellani-Coulie, et al., "Development of a CMOS Oscillator Concept for Particle Detection and Tracking," IEEE Transactions on Nuclear Science, vol. 60, No. 4, 2013, 7 pages.

S. Ben Krit, et al., "First investigations on the feasibility of integration of a smart sensor in harsh environment," Advancements in Nuclear Instrumentation Measurement Methods and their Applications, 2013, 23 pages.

International Search Report dated Jul. 3, 2015 in PCT/FR2015/050604 Filed Mar. 11, 2015.

French Search Report dated Sep. 26, 2014 in FR 1452017 Filed Mar. 11, 2014.

* cited by examiner

DEVICE AND METHOD FOR DETECTING RADIATION PARTICLES

This invention relates to a device for detecting radiation particles by analysis of the singular effects that they provoke. In particular, for the analysis of electronic components, this can be transient effects that affect the analog circuits or clocks or switching effect that induces errors in the memories. It also relates to a corresponding detection method.

Such a detection device generally comprises at least one sensor for sensing radiation particles, capable of supplying an electrical pulse when it is traversed by at least one radiation particle that generates charges, and at least one detection circuit that receives and processes this electrical pulse supplied by the sensor. Indeed, the electrical pulse supplied by the sensor is generally so low that it cannot be used directly.

A device of this type was for example presented at the ANIMMA 2013 conference, "Advancements in Nuclear Instrumentation Measurement Methods and their Applications", held in Marseille (FR) on Jun. 23-27, 2013, under the title "First investigations on the feasibility of integration of a smart sensor in harsh environments". In this device, a first stage of the detection circuit comprises a low-noise amplifier fulfilling a role of conversion of the electrical pulse supplied by the sensor for sensing radiation particles into a voltage of which the maximum amplitude is proportional to the quantity of charges detected by the sensor. A second stage of the detection circuit comprises an analog conditioner for formatting the analog voltage signal supplied by the first stage in such away as to make it more easily convertible into a digital signal. This analog conditioner is comprised of a differentiator and second order integrators carried out using operational amplifiers. Finally, a third stage of the detection circuit comprises an analog-to-digital converter and a digital signal processor for analyzing the signal supplied by the second stage and characterizing the radiation particle or particles detected by digital processing.

This detection circuit configured as an acquisition chain is well known and used in the large majority of radiation particle detectors that use discrete components. But as in any acquisition chain, the constraints in terms of noise of the first stage are very substantial in order to ensure good sensitivity of the chain if it is desired to control the electronic consumption of the whole. For solutions such as networks of sensors or onboard detectors, the integration of all or of a portion of the acquisition chain is required while still controlling its electrical consumption. In this case, the performance in terms of noise and consumption of the amplifiers of the chain become so constraining that to date there are few solutions that are fully integrated. Moreover the noise acts substantially on the amplitude of the signals, which then makes difficult any later processing of the information contained in these signals.

In the article by Castellani-Coulié et al, entitled "Development of a CMOS oscillator concept for particle detection and tracking", published in IEEE Transactions on Nuclear Science, volume 60, no. 4, pages 2450-2455, August 2013, a device is preferred wherein the detection circuit comprises a voltage-controlled oscillator to which the electrical pulse originating from the sensor is supplied as the control voltage.

The invention applies more particularly to a device of this type, i.e. comprising:

at least one sensor for sensing radiation particles, capable of supplying an electrical pulse when it is traversed by at least one radiation particle, and at least one detection circuit comprising a voltage-controlled oscillator to which said electrical pulse originating from the sensor is supplied as the control voltage.

In particular, the oscillator of the aforementioned article provides as output a signal of which the instantaneous frequency and the phase are characteristics of the electrical pulse supplied by the sensor. But the device proposed also has disadvantages. Firstly, the oscillator is formed by cascaded operational amplifiers of which the electronic components remain nevertheless rather complex. Moreover, the signal supplied as output must be processed digitally using a polynomial model in order to link its phase and frequency variations to the shape of the electrical pulse supplied by the sensor. This processing is also rather complex.

It can as such be desired to provide a device for detecting radiation particles of the aforementioned type that makes it possible to overcome at least part of the problems and constraints mentioned hereinabove.

A device for detecting radiation particles is therefore proposed, comprising:

at least one sensor for sensing radiation particles, capable of supplying an electrical pulse when it is traversed by at least one radiation particle, at least one detection circuit comprising a voltage-controlled oscillator to which said electrical pulse originating from the sensor is supplied as the control voltage, wherein the voltage-controlled oscillator is a ring oscillator.

A ring oscillator has few properties in common with an oscillator such as the one described in the article by Castellani-Coulié et al. Firstly, it is harmonic, while an oscillator with analog operational amplifiers has relaxation properties. Then, it was noticed, surprisingly, that when a ring oscillator is powered with electric current by a sensor for sensing radiation particles, it provides as output a signal that can be used of which the shape is true to that of the electrical pulse received. However this shape is characteristic of the radiation particle or particles detected. The processing of this output signal is therefore clearly more immediate than those proposed in prior art. Finally, a ring oscillator is generally constituted of components that are simpler and more robust that those of operational amplifiers, in such a way that it is entirely suitable for applications according to which the detection circuit has to be on board with the particle sensor, in particular in harsh environments in terms of temperature and radiation. Its simplicity further makes it possible to improve the performance concerning the noise and the electrical consumption as compared to existing devices.

Optionally, the ring oscillator is configured using a set point voltage in such a way that the period that corresponds to its natural oscillating frequency in the absence of a control voltage is less than a minimum duration of the electrical pulse that can be supplied by the sensor.

Also optionally, the ring oscillator comprises an odd number of logic inverters arranged in series and a feedback loop connecting the output of the last logic inverter of the series to the input of the first logic inverter of the series.

Also optionally, each logic inverter is a CMOS inverter comprising the combination of a P-channel field effect transistor and of an N-channel field effect transistor, with the sources of the P-channel transistors of each logic inverter being connected to a set point voltage and the drains of the N-channel transistors of each logic inverter being connected to a polarization voltage.

Also optionally, a device for detecting radiation particles according to the invention can comprise a plurality of detection circuits, with each detection circuit being calibrated in such a way as to be sensitive to a predetermined energy band of radiation particles.

Also optionally, a device for detecting radiation particles according to the invention can comprise a plurality of radiation particle sensors arranged in a matrix, with each sensor being associated with a detection circuit calibrated on a predetermined energy band of radiation particles.

Also optionally, the detection circuit comprises a circuit for analyzing an output signal of the ring oscillator for the characterization of radiation particles.

Also optionally, the sensor for sensing radiation particles is a semiconductor sensor comprising a PIN diode.

A method for detecting radiation particles is further proposed, comprising:
the supplying, by at least one sensor for sensing radiation particles, of an electrical pulse when it is traversed by at least one radiation particle,
the transmitting of this electrical pulse, as the control voltage, to a voltage-controlled oscillator of at least one detection circuit, and
the analysis of an output signal of the voltage-controlled oscillator for the characterization of radiation particles,
according to which the voltage-controlled oscillator is a ring oscillator and the characterization of radiation particles is carried out by an analysis of the temporal shape of the output signal of this ring oscillator.

Optionally, the output signal analyzed is a signal indicating an instantaneous frequency of oscillation or of average output voltage of the ring oscillator.

Figure 2:
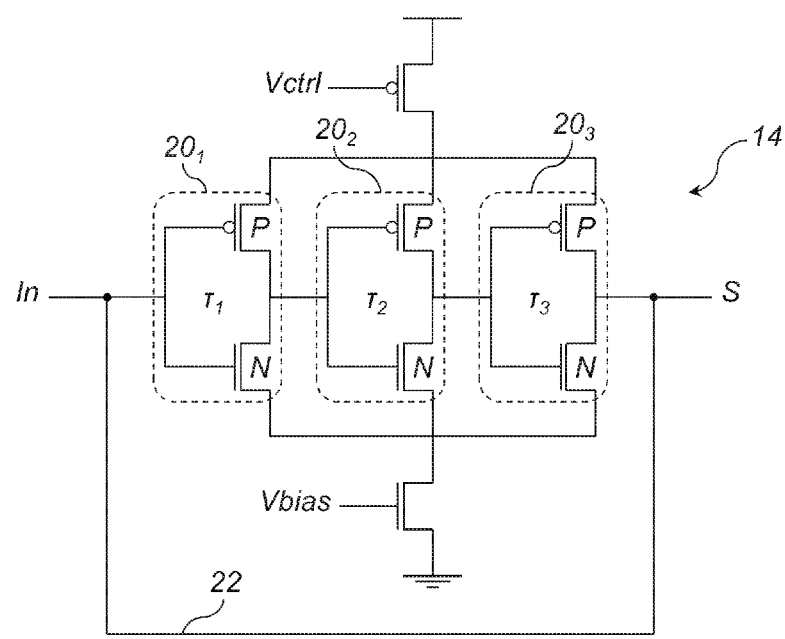
Figure 3:
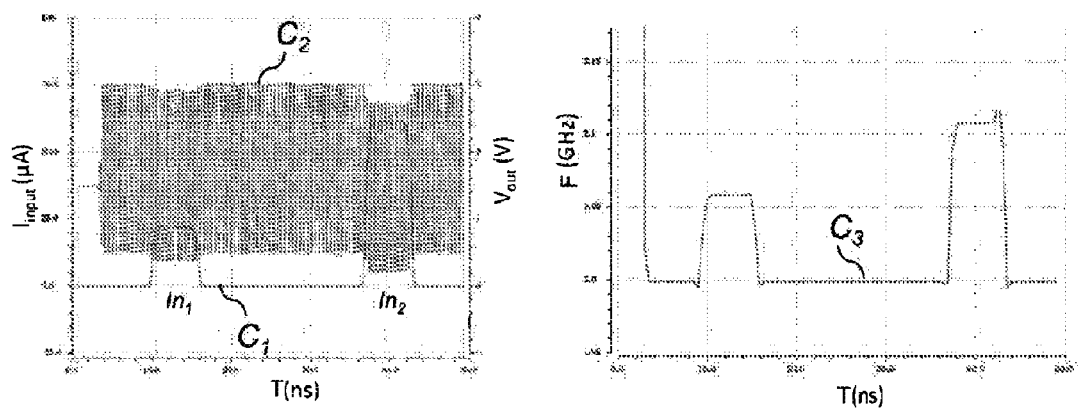
Figure 4:
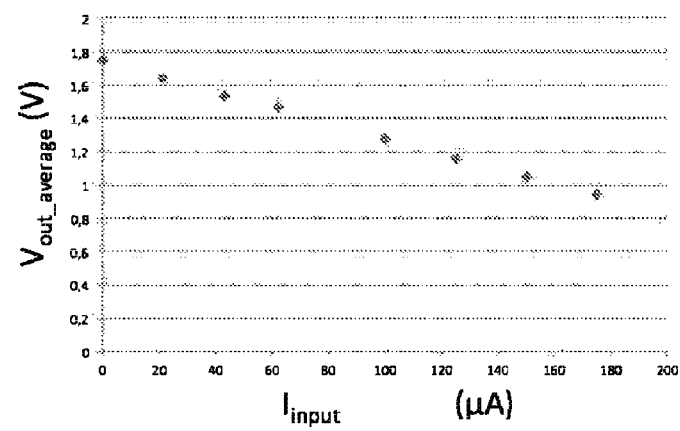
Figure 5:
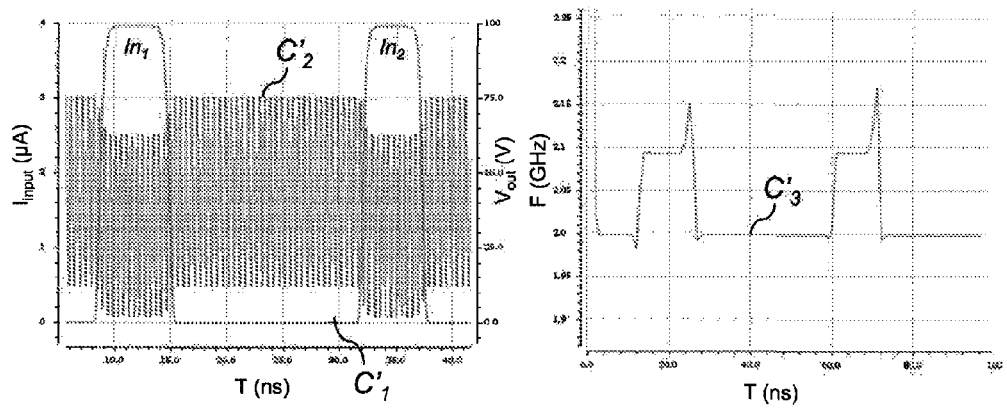
Figure 6:
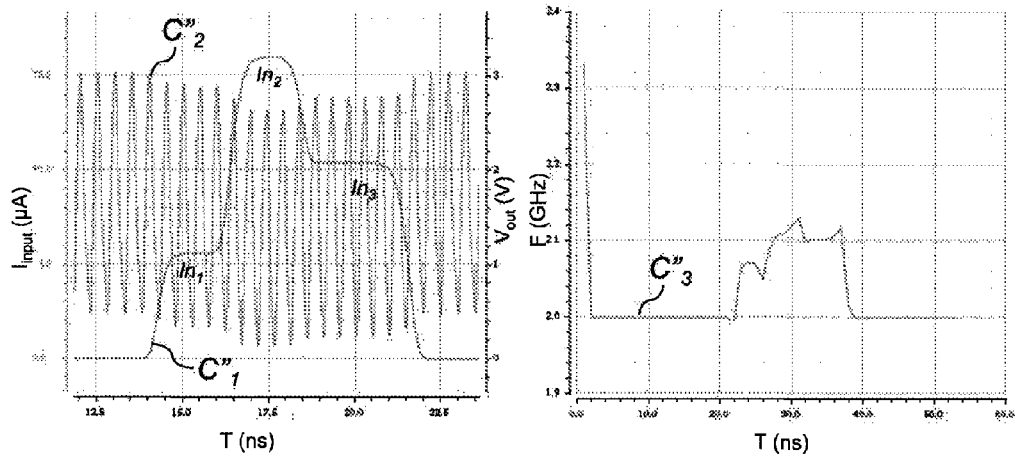
Figure 7:
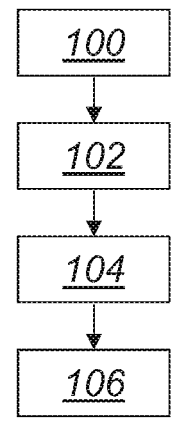
Figure 8:
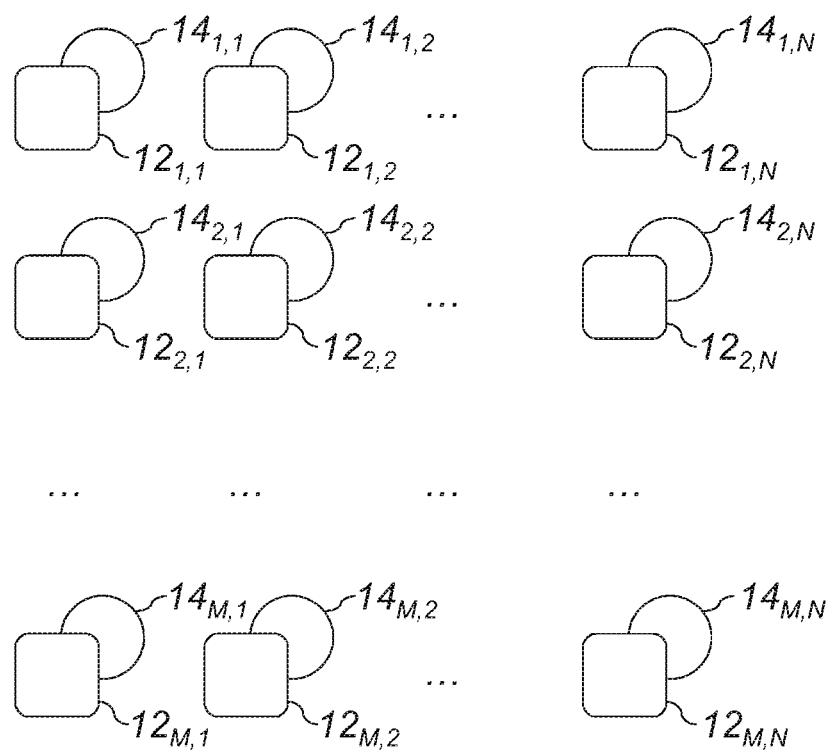

The invention will be better understood using the following description, provided solely by way of example and given in reference to the annexed drawings wherein:

FIG. 1 diagrammatically shows the general structure of a device for detecting radiation particles according to an embodiment of the invention, FIG. 2 diagrammatically shows a possible implementation of a ring oscillator of the device of FIG. 1, FIG. 3 shows, using temporal diagrams, an example of input and output signals of the ring oscillator of FIG. 1 or 2, FIG. 4 shows, using a temporal diagram, a relation of linearity in amplitude between the input and the output of the ring oscillator of FIG. 1 or 2, FIGS. 5 and 6 show, using temporal diagrams, two other examples of input and of output signals of the ring oscillator of FIG. 1 or 2, FIG. 7 shows the successive steps of a method for detecting radiation particles, according to an embodiment of the invention, and FIG. 8 diagrammatically shows a plurality of sensors of a device for detecting radiation particles according to another embodiment of the invention.

The device 10 for detecting radiation particles shown in FIG. 1 comprises a sensor 12 for sensing radiation particles, capable of supplying an electrical pulse In when it is traversed by at least one radiation particle, and a detection circuit able to process this electrical pulse In which cannot be used directly as is. The detection circuit comprises a voltage-controlled oscillator 14, more precisely a ring oscillator, and a circuit for analyzing 16 an output signal S of the ring oscillator 14.

The sensor 12 is a CMOS sensor, comprising for example a PIN diode 18 connected to a VDD potential using a resistor R.

The ring oscillator 14 comprises an odd number of logic inverters, for example three logic inverters $20_1$, $20_2$ and $20_3$ arranged in series. It further comprises a feedback loop 22 connecting the output of the last logic inverter of the series, $20_3$, to the input of the first logic inverter of the series, $20_1$. It receives the electrical pulse In as input of the first logic inverter $20_1$, i.e. as the control voltage. It provides as output of the third logic inverter $20_3$ the signal S that can be used by the circuit for analysis 16. This signal S is for example an average output voltage signal or an instantaneous frequency oscillation signal of the ring oscillator 14.

FIG. 2 shows more precisely a possible implementation of the ring oscillator 14. Each logic inverter $20_1$, $20_2$ and $20_3$ of this ring oscillator 14 is a simple CMOS inverter which comprises a single input and a single output. The input of any one of the logic inverters powers the gates of two P-channel and N-channel field effect transistors arranged in parallel, with the drain of the P-channel transistor and the source of the N-channel transistor being joined in order to provide the output of the logic inverter. Furthermore, the sources of the P-channel transistors of the three logic inverters $20_1$, $20_2$ and $20_3$ are connected to a common set point voltage Vctrl and the drains of the N-channel transistors of the three logic inverters are connected to a common polarization voltage Vbias.

The three logic inverters $20_1$, $20_2$ and $20_3$ respectively generate three delays $T_1$, $T_2$ and $T_3$ of which the sum is equal to a half-period of natural oscillation of the ring oscillator 14. The set point voltage Vctrl makes it possible to configure these delays in such a way as to adjust the natural oscillation frequency of the ring oscillator 14. As shall be shown in FIGS. 3, 5 and 6 and detailed later, it is advantageous that the period that corresponds to the natural oscillation frequency of the ring oscillator 14 in the absence of control voltage be less than a minimum duration of the electrical pulse In that can be supplied by the sensor 12. It is even more advantageous that this period corresponding to the natural oscillation frequency of the ring oscillator 14 be more than twice, even more than three times less than the minimum duration of the electrical pulse In.

The polarization voltage Vbias makes it possible to adjust the current-voltage characteristic of each inverter $20_1$, $20_2$ and $20_3$ in an unsaturated zone of decreasing linearity.

The diagram on the left in FIG. 3 shows an example of instantaneous voltage $V_{out}$ measured at the output of the ring oscillator 14 (curve $C_2$) according to the current $I_{input}$ supplied as input (curve $C_1$). In this example, two radiation particles traverse the sensor 12, generating two electrical pulses noted as $In_1$ and $In_2$. For purposes of simplifying the illustration, these pulses are modeled in the form of square signals with different amplitudes. Note that, in this example where the duration of the two electrical pulses $In_1$ and $In_2$ is more than three times greater than the period of the oscillations of the instantaneous voltage $V_{out}$, the oscillator indeed reproduces as output the shape of the electrical pulses, but inverted. Also note, if the instantaneous frequency F of the oscillations is observed on the right-hand portion of FIG. 3 (curve $C_3$), that this output signal S=F of the ring oscillator 14 also reproduces the shape of pulses.

Moreover, if the average output voltage $V_{out_{average}}$ according to the intensity of the current $I_{input}$ provided at the input of the ring oscillator 14 is observed, it is observed, as shown in FIG. 4, that the average output voltage is a decreasing linear function of this input intensity. This explains the diagram on the left in FIG. 3 wherein the oscillations at the output reproduce in an inverted manner the pulses $In_1$ and $In_2$.

As such, one of the following two signals S can be observed at the output of the ring oscillator 14: the instantaneous frequency F or the average output voltage $V_{out\_average}$. The width of the electrical pulses $In_1$ and $In_2$ can be read for example on the curve of the instantaneous frequency F and their amplitude can be read on the curve of the average output voltage $V_{out\_average}$.

In FIG. 5, another example of instantaneous voltage $V_{out}$ and of instantaneous frequency F measured at the output of the ring oscillator 14 (curves $C'_2$ and $C'_3$) according to the current $I_{input}$ supplied as input (curve $C'_1$) is shown. It can be seen here that the result is also convincing when the two electrical pulses $In_1$ and $In_2$ are of different durations.

In FIG. 6, yet another example of instantaneous voltage $V_{out}$ and of instantaneous frequency F measured at the output of the ring oscillator 14 (curves $C''_2$ and $C''_3$) according to the current $I_{input}$ supplied as input (curve $C''_1$) is shown. We see here that the result is also convincing when the electrical pulses, here three pulses $In_1$, $In_2$ and $In_3$, are superimposed. With the condition of knowing a priori the expected shape of the pulses, it is easy to find these pulses by reading the curves $C''_2$ and $C''_3$.

In the three examples shown in FIGS. 3, 5 and 6, the electrical pulses have intensities of a few units or tens of μA. In order to change the detection scale, i.e. with higher currents (on the scale of mA for example), it is sufficient to consequently re-dimension the logic inverters, such as is well known to those skilled in the art.

A method for detecting radiation particles implemented by the device 10 of FIG. 1 shall now be detailed in reference to FIG. 7.

During a first step 100, at least one radiation particle traverses the sensor 12 which provides as a response an electrical pulse In.

This electrical pulse In is supplied as input of the ring oscillator 14 as the control voltage during a following step 102.

The output S of this ring oscillator is supplied in the following step 104. This output S is, as indicated hereinabove, the average output voltage $V_{out\_average}$ and/or the instantaneous frequency F of the ring oscillator 14.

Finally, during a last step 106, the temporal shape of the output signal S is analyzed in a manner known per se by the circuit for analyzing 16 in order to characterize the radiation particle or particles detected by the sensor 12. In light of the shape of the electrical pulses faithfully reproduced in the output signal S, this analysis, including for example the study of the amplitude or of the duration of the pulses, is particularly simple and immediate. Moreover, conventional analyses such as that mentioned in the aforementioned article of Castellani-Coulié et al, consisting in making the output signal S square using a "bufferization" chain (for example a chain of inverters) and in deducing therefrom the frequency and the phase of the output signal S over time using a reference frequency, can indeed be implemented in the circuit for analyzing 16. The detail of these well-known analyses is not reproduced here as it is easily adaptable from the aforementioned article by Castellani-Couliéet al.

The device 10 and the method described hereinabove can moreover be adapted for spectroscopy applications. The detection circuit described hereinabove is indeed adapted, according to its calibration and its configuration, i.e. according to the adjusting of the natural oscillation frequency of its ring oscillator (constituting a threshold in pulse duration that can be detected) and according to the dimensioning of its logic inverters (constituting a threshold in pulse amplitude that can be detected), to a certain energy band of radiation particles, with this energy band being defined by the aforementioned thresholds. By calibrating several detection circuits differently, i.e. by calibrating several ring oscillators differently, in such a way as to cover several successive energy bands to which these detection circuits are sensitive according to the thresholds defined by their calibration and configuration, and by proceeding with differential measurements between detection circuits, it is possible to quantify the radiation particles detected according to their energy E=hv and therefore to discriminate them via processing.

This can be done in several different ways. For example, by connecting several detection circuits at the output of the sensor 12, or, as shown in FIG. 8, by designing a matrix of sensors $12_{1,1}, \ldots, 12_{m,n}, \ldots, 12_{M,N}$ with each one connected to a specific detection circuit and to a ring oscillator $14_{1,1}, \ldots, 14_{m,n}, \ldots, 14_{M,N}$, a spectroscope with M×N different energy bands is obtained. The matrix detection comprises the advantage of very clearly increasing the detection surface with respect to existing detectors.

It clearly appears that a device and a method for detecting radiation particles such as those described hereinabove make it possible to considerably simplify the detection and the characterization of radiation particles. The direct consequences of this simplicity are the robustness (in particular to the noise) and the low consumption of such a solution, in such a way that the onboard applications are particularly facilitated.

The applications are further multiple since it is sufficient to adapt the sensor or sensors and the circuit or circuits for detecting to such and such type of radiation particles in order to be able to consider very different fields of application such as the space, military, aeronautics, medical or nuclear fields for:

the analysis of the reliability of electronic components and of the impact of an environment with non-negligible radioactivity on these components in terms of hardening, robustness, lifespan, security (applications based on microelectronics are indeed increasingly sensitive to the ambient noise generated by the ionizing particles with low energy), the satellite or electric transportation (train, car) industry,
the protection against ionizing radiation (detectors for radioprotection),
medical (treatment of pathologies or tumors), in terms of dosages and measurements,
security (in particular the security of commercial and banking transactions),
petrochemicals (drilling, in particular for searching for shale gas: mapping underground ionizing rocky environments).
etc.

Note moreover that the invention is not limited to the embodiments described hereinabove. It will indeed appear to those skilled in the art that various modifications can be made to the embodiments described hereinabove, in light of the information that has just been disclosed to them. In the following claims, the terms used must not be interpreted as limiting the claims to the embodiments disclosed in this description, but must be interpreted in order to include therein all of the equivalents that the claims aim to cover due to their formulation and for which the foresight is within the scope of those skilled in the art by applying their general knowledge to the implementation of the teaching that has just been disclosed to them.

The invention claimed is:

1. A device for detecting radiation particles, comprising:
    at least one sensor configured to sense radiation particles, and to supply an electrical pulse when the at least one sensor is traversed by at least one radiation particle; and
    at least one detection circuit including a voltage-controlled oscillator to which said electrical pulse originating from the at least one sensor is supplied as a control voltage,
    wherein the voltage-controlled oscillator is a ring oscillator.

2. The device for detecting radiation particles according to claim 1, wherein the voltage-controlled ring oscillator is configured using a set point voltage such that a period corresponding to a natural oscillation frequency of the voltage-controlled ring oscillator in the absence of the control voltage is less than a minimum duration of the electrical pulse supplied by the at least one sensor.

3. The device for detecting radiation particles according to claim 1, wherein the voltage-controlled ring oscillator has an odd number of logic inverters arranged in series, and a feedback loop connecting an output of a last logic inverter of the series to an input of a first logic inverter of the series.

4. The device for detecting radiation particles according to claim 3, wherein each said logic inverter is a CMOS inverter having a combination of a P-channel field effect transistor and of an N-channel field effect transistor, with sources of the P-channel transistors of each said logic inverter being connected to a set point voltage and drains of the N-channel transistors of each said logic inverter being connected to a polarization voltage.

5. The device for detecting radiation particles according to claim 1, further comprising a plurality of said at least one detection circuit, with each said detection circuit being calibrated to be sensitive to a predetermined energy band of radiation particles.

6. The device for detecting radiation particles according to claim 1, further comprising a plurality of said at least one sensor configured to sense radiation particles arranged in a matrix, with each said sensor being associated with a corresponding detection circuit of said at least one detection circuit calibrated on a predetermined energy band of radiation particles.

7. The device for detecting radiation particles according to claim 1, wherein the at least one detection circuit includes a circuit configured to analyze an output signal of the voltage-controlled ring oscillator to characterize radiation particles.

8. The device for detecting radiation particles according to claim 1, wherein the at least one sensor configured to sense radiation particles is a semiconductor sensor comprising a PIN diode.

9. A method for detecting radiation particles, comprising:
    supplying, by at least one sensor configured to sense radiation particles, of an electrical pulse when the at least one sensor is traversed by at least one radiation particle;
    transmitting the electrical pulse, as a control voltage, to a voltage-controlled oscillator of at least one detection circuit; and
    analyzing an output signal of the voltage-controlled oscillator to characterize radiation particles,
    wherein the voltage-controlled oscillator is a ring oscillator, and the characterization of radiation particles is carried out by an analysis of a temporal shape of the output signal of the voltage-controlled ring oscillator.

10. The method for detecting radiation particles according to claim 9, wherein the output signal of the voltage-controlled ring oscillator analyzed is a signal indicating an instantaneous frequency of oscillation or of an average output voltage of the voltage-controlled ring oscillator.

11. The device for detecting radiation particles according to claim 1, wherein an output of the at least one sensor is directly connected to an input of the voltage-controlled oscillator.

12. The method for detecting radiation particles according to claim 9, wherein said transmitting the electrical pulse from the at least one sensor as the control voltage of the voltage-controlled ring oscillator is transmitted directly from the at least sensor to the voltage-controlled ring oscillator.

* * * * *